United States Patent

Ma

[11] Patent Number: 5,727,384
[45] Date of Patent: Mar. 17, 1998

[54] ENGINE MANAGEMENT SYSTEM

[75] Inventor: Thomas T. Ma, South Woodham Ferrers, Great Britain

[73] Assignee: Ford Global Technologies, Inc., Dearborn, Mich.

[21] Appl. No.: 602,850

[22] PCT Filed: Jul. 20, 1994

[86] PCT No.: PCT/GB94/01568

§ 371 Date: Feb. 28, 1996

§ 102(e) Date: Feb. 28, 1996

[87] PCT Pub. No.: WO95/06811

PCT Pub. Date: Mar. 9, 1995

[30] Foreign Application Priority Data

Aug. 28, 1993 [GB] United Kingdom .................... 9317980

[51] Int. Cl.$^6$ .................... F01N 3/20; F02N 17/02
[52] U.S. Cl. .................... 60/284; 60/300; 123/142.5 E; 123/179.21; 123/549; 123/557
[58] Field of Search .................. 60/284, 300; 123/142.5 E, 123/549, 557, 179.21

[56] References Cited

U.S. PATENT DOCUMENTS

| | | | |
|---|---|---|---|
| 5,184,463 | 2/1993 | Becker | 60/284 |
| 5,390,493 | 2/1995 | Fujishita | 60/284 |

*Primary Examiner*—Douglas Hart
*Attorney, Agent, or Firm*—Allan J. Lippa

[57] ABSTRACT

A management system of an engine having a hot operating system (a catalytic converter or fuel vaporiser) and a rapid heating system for the hot operating system includes a clock and means to operate the clock after the engine has stopped where the clock operates to issue a signal indicating the time since the last engine switch off. An estimator is coupled to the clock for estimating the temperature of the hot operating system prior to restarting the engine on the basis of signals from the clock indicating the time since last engine switch off and a heating system controller controls the rapid heating system in dependence upon the estimated temperature of the hot operating system prior to restarting the engine.

4 Claims, 2 Drawing Sheets

ENGINE MANAGEMENT SYSTEM

FIELD OF THE INVENTION

The present invention relates to an engine management system for an engine having a rapid heating system for a catalytic converter or a fuel vaporiser.

BACKGROUND OF THE INVENTION

In the following specification, the term "hot operating system" shall mean a catalytic converter or a fuel vaporizer.

For any fast catalyst light off heating system (exhaust gas ignition, external fuel burner, electrically heated catalyst) and fast warm up heating system (glow plug, fuel vaporiser), there is a risk that if the system is operated more than once in close succession damage would occur.

For example, in a vehicle equipped with such a heating system, it is desirable to have the vaporiser or the catalytic converter in full operation within seconds or even a fraction of a second as soon as the car is started, and the heating system should therefore be operated during cold starts. However, if the car stalls and is restarted immediately, the catalyst is already hot, the glow plug is still hot, the fuel vaporiser is already hot, but everything else in the car remains cold. Unless there are temperature sensors measuring these hot elements directly, the engine management microprocessor would have no indication that the second start is any different from the first and would give the heating system another dose of intense heat which could cause damage to the fuel vaporiser or the catalytic converter.

A difficulty currently encountered in complying with statutory regulations is that the temperature sensing elements available do not have the required proven durability and direct temperature measurement is not currently an available solution this problem.

The invention therefore seeks to provide alternative safeguards to protect against damage through overheating.

One possible solution to this problem would be to store in a keep alive memory the coolant temperature at the time the engine is stopped or stalls and to compare the stored reading with a current measurement of the coolant temperature during the attempt to restart the engine. If the engine was hot when switched off and is now cold, then it is safe to operate the heating system but if the engine coolant was cold and is still cold, this suggests that the engine is being restarted after only a very short run and that it is therefore unsafe to operate the heating system.

The problem with this system however is that the time that has elapsed since the engine was switched off is still not known and it is possible that an engine that was run for a very brief period may have been allowed to stand for long enough to cool down fully and in this case the heating system will fail to operate during the next start, even though it should be switched on normally.

Another situation is when the engine is stopped after it has fully warmed. The coolant temperature will continue to rise for a period because of redistribution of heat within the engine when the coolant flow is stopped and will then cool relatively slowly whereas the catalyst or the fuel vaporiser will start to cool immediately after the engine is stopped and will cool more quickly. If the engine is restarted during this period, the engine management system will read the input from the coolant temperature sensor which indicates that the engine is still hot and will prevent activation of the rapid heating system even though the catalyst or the fuel vaporiser is already cold and the heating system should be activated.

U.S. Pat. No. 4,499,879 discloses a management system of an internal combustion engine including a real time clock that continues to operate after the engine has stopped. The engine temperature is estimated based on the elapsed time after engine shutdown and use to determine the fuelling requirements of the engine at restart. The latter patent is not concerned with a heatable catalyst nor a heatable fuel vaporiser, neither of which is mentioned in the patent.

It is also known from DE-A-40 29 811 to control an engine catalyst heater during a restart or warm start as a function of engine temperature and intake air temperature.

SUMMARY OF THE INVENTION

In accordance with the present invention, there is provided a management system of an engine having a hot operating system and a rapid heating system for the hot operating system, the management system including a clock means to operate the clock after the engine has stopped, the clock operating to issue a signal indicating the time since the last engine switch off means connected to the clock for estimating the temperature of the hot operating system prior to restarting the engine on the basis of signals from the clock indicating the time since the last switch off, and means for controlling the rapid heating system in dependence upon the estimated temperature of the hot operating system prior to restarting of the engine.

The hot operating system is a catalytic converter or a fuel vaprorizer.

Thus, in the invention, the heating system is protected by having a clock, preferably built into the microprocessor of the engine management system, which continues to run even after the processor is switched off.

In a simple embodiment, this clock can be used to prevent operation of the rapid heating system for a predetermined time after the engine is switched off, this period being varied if required as a function of the time that the engine was running before it was switched off. When the processor is switched on again in the next engine start, it would have information of the "time since engine off" to estimate how much the hot element would have cooled. It can then decide whether the rapid heating system should be energised with the start or partially energised and by how much.

Engine management microprocessors do not have a real time clock that remains active at all times since to maintain the processor active at all times, when the engine is not running, would place an unacceptable drain on the battery.

In a preferred embodiment of the invention, means are provided to maintain the engine management microprocessor operating in a low activity mode after the engine has stopped to provide a periodically updated estimate of the temperature of the heating system or the catalyst, the microprocessor being fully switched off as soon as the estimated temperature drops below a threshold value that is safe for reactivation of the heating system at the next start, or after a predetermined time. In this case, the predetermined time may be selected by the microprocessor in dependence upon a current temperature measurement or estimate at the time that the engine stops.

In this way, the invention does not call for the engine management microprocessor to be active at all times and does not therefore place a permanent drain on the battery that could for example interfere with the vehicle being restarted after an extended period at stand still. It does however allow the management system to determine at all times if it is safe to reactivate the heating system.

The time since last switch off in combination with coolant temperature also provides an indication of the quantity of fuel that may remain in the engine from its previous period of operation. In a preferred embodiment of the invention, this information can be used to fine-tune the fuelling calibration during the later start to take into account the amount of residual fuel in the engine system. In particular, fuel enrichment can be modified if the engine should stall during a cold start, and this can avoid plug fouling, overheating of the catalytic converter and excessive hydrocarbon emissions.

DESCRIPTION OF THE PREFERRED EMBODIMENT

Figure 1:
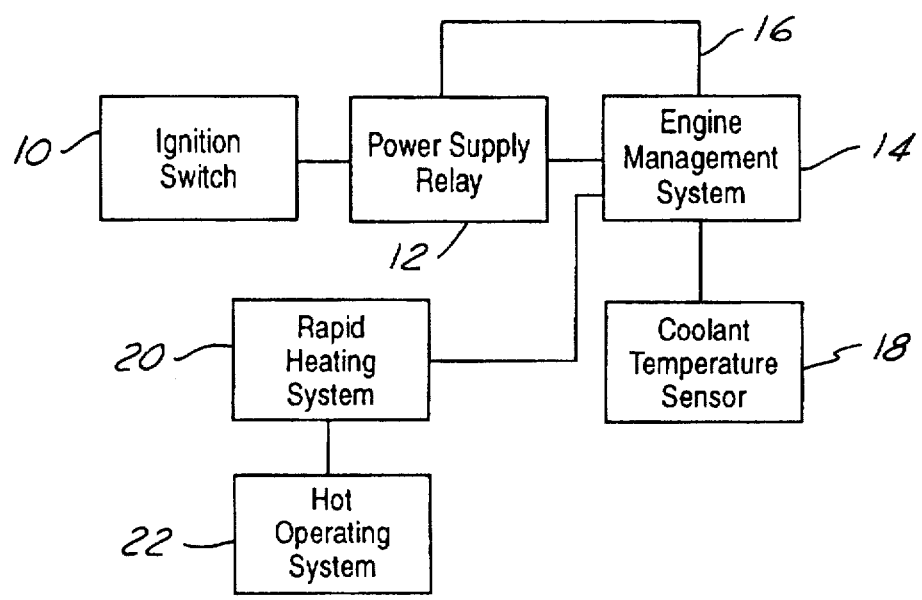
Figure 2:
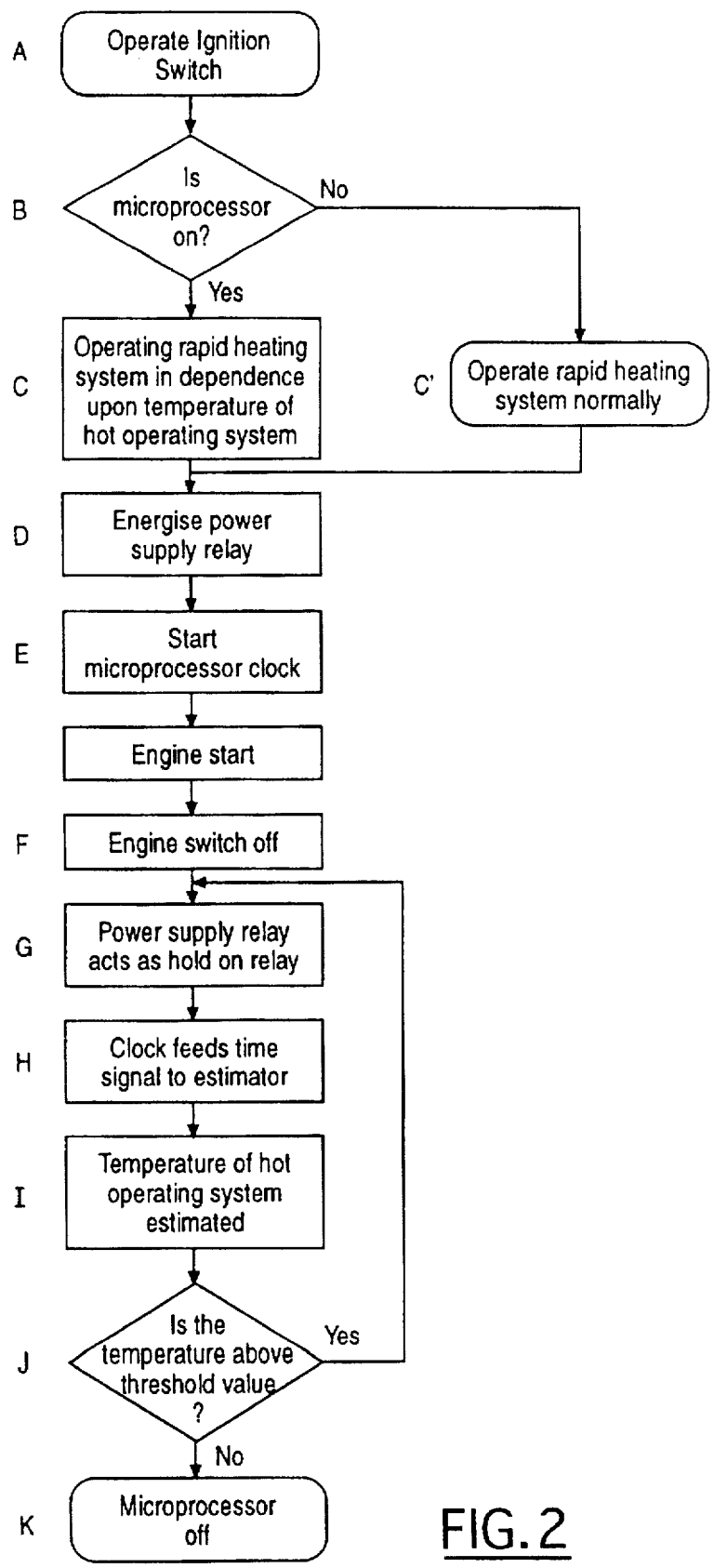

The invention will now be described further, by way of example, with reference to the accompanying drawings in which: FIG. 1 is a block diagram of the engine management system, and FIG. 2 is a flow diagram of its operation.

In the drawing, an engine management system 14 which in this case is a microprocessor is brought into operation by an ignition switch 10 (Step A of FIG. 2) and a power supply relay 12 (Step D of FIG. 2) each time the engine is to be started. The engine management system 14 receives a variety of input signals of which only one, from a coolant temperature sensor 18, is illustrated in the drawing.

The engine management system 14 also has several outputs that control the ignition, the engine fuelling and the operation of a heating system for raising the temperature of a catalytic converter during cold starts, or for vaporising fuel during cold starts. The operation of the engine management system is well known per se and need not therefore be described in detail in the present context.

The heating system (20) for the catalytic converter (22) may be any of several that have been described in the prior art. Amongst these there are known systems which ignite exhaust gases, systems which ignite fuel from an external source and electrical heating elements incorporated into the catalyst. The heating system used for vaporising the fuel in common with the means for igniting fuel or exhaust gases can take the form of a glow plug.

As so far described the illustrated system is known and suffers from the problem that when the engine is switched off (Step F of FIG. 2) the management system has no way of knowing the time that has lapsed since previous operation. When it comes to life, the management system could believe the engine to be cold based upon the signal from the engine coolant temperature sensor 18 despite the fact that the heating system has recently been heated during the cold start that has not lasted long enough to affect the engine coolant temperature, for example, if the vehicle is driven only a few feet or the engine stalls shortly after starting.

To avoid this particular problem, the engine management system 14 has an output line 16 which can be used to keep the engine management system 14 alive by activating the power supply relay 12 (Steps D and E of FIG. 2) despite the fact that the ignition switch 10 has been turned off. (Step F of FIG. 2) The microprocessor is standard, and as such includes an internal clock which operates while the microprocessor operates. In effect the relay 12 now acts as a hold-on relay (Step G of FIG. 2) that keeps the engine management system in operation, performing if necessary only a reduced function, until the management system 14 determines that it would be safe to energise the heating system normally in the next cold start. (Step J of FIG. 2) The management system can by knowing the time since the engine was switched off estimate the temperature of the catalytic converter or fuel vaporizer.

If an attempt is made to start the engine (Step A of FIG. 2) before the management system has switched itself off then the data and its own programming (Step B and C or C' of FIG. 2) can determine the extent that the heating system 20 should be energised to reach its operating state in the minimum time without overheating.

Because the management system 14 does ultimately switch itself off, (Step K of FIG. 2) there is no need to provide a constantly running clock nor to maintain the management system 14 operational at all times, both of which would place an unacceptable current drain on the battery.

The engine management system can now also take the starting conditions into consideration not only when controlling the heating system but when performing its other functions, in particular fuel metering for cold start and exhaust gas ignition. Thus the presence of fuel wetting the walls of the intake system may be taken into account to avoid over-fuelling during a rapid restart.

I claim:

1. A management system of an engine having a hot operating system and a rapid heating system for the hot operating system, the management system including a clock, and means to operate the clock after the engine has stopped, the clock operating to issue a signal indicating the time since the last engine switch off, means coupled to the clock for estimating the temperature of the hot operating system prior to restarting the engine on the basis of signals from the clock indicating the time since the last switch off, and means for controlling the rapid heating system in dependence upon the estimated temperature of the hot operating system prior to restarting of the engine.

2. A management system as claimed in claim 1, which system comprises a programmed micro-processor, the clock being the internal clock of the microprocessor.

3. A management system as claimed in claim 2, which system includes means to maintain itself in a low activity mode after the engine has stopped, and the estimator operates periodically to provide a periodically updated estimate of the temperature of the hot operating system, the microprocessor including a comparator for comparing the estimate of the temperature with a threshold value that is safe for reactivation of the rapid heating system at the next start, and a switch for switching the microprocessor off as soon as the estimated temperature falls below a threshold value.

4. A management system as claimed in claim 3, of an engine further including a coolant, the system further including sensing means for sensing the coolant temperature and fuel determining means coupled to the sensing means and the clock such that the lapsed time from the last time the engine stopped and the coolant temperature are further taken into account in determining the fuelling of the engine.

\* \* \* \* \*